UNITED STATES PATENT OFFICE.

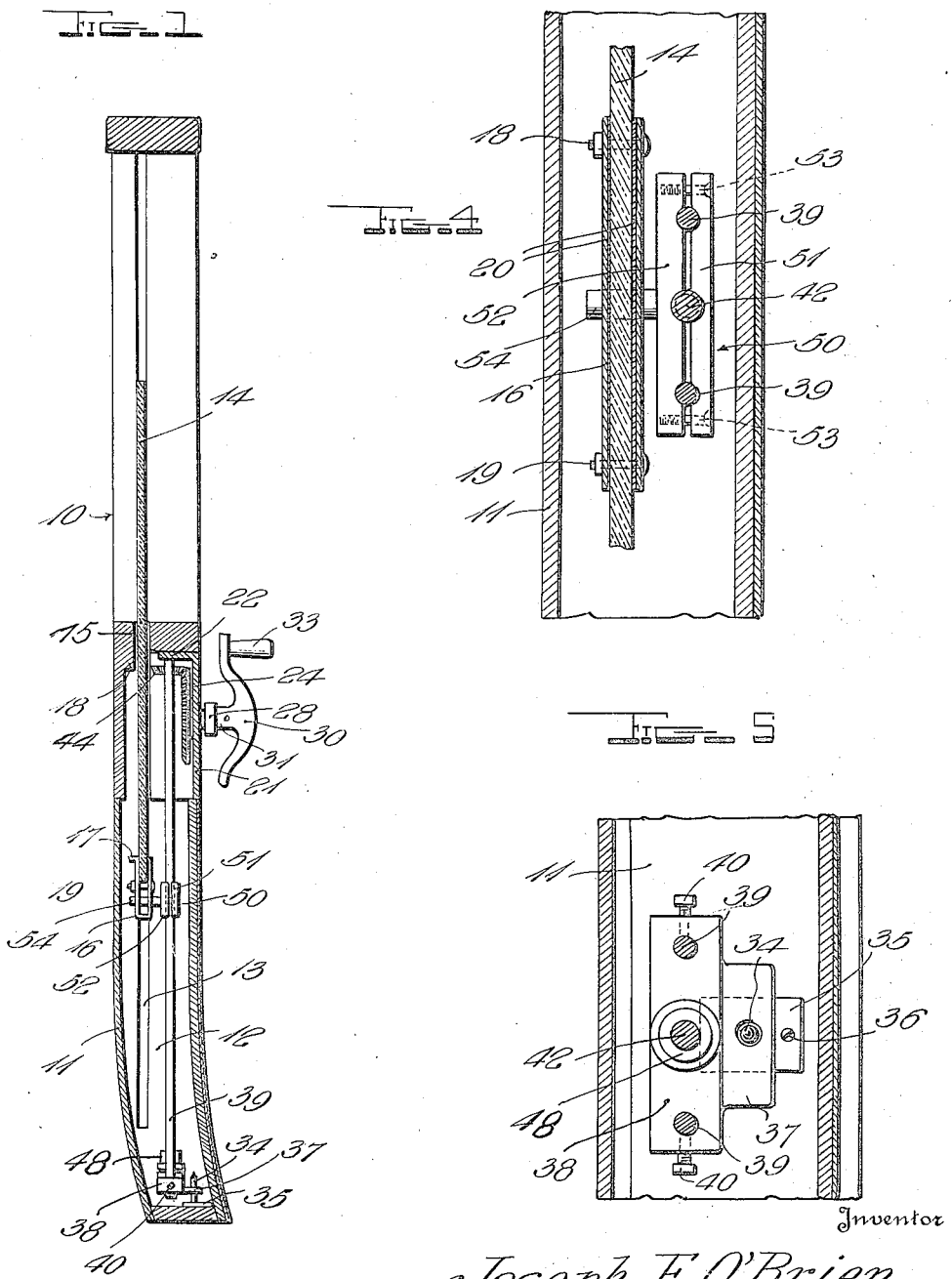

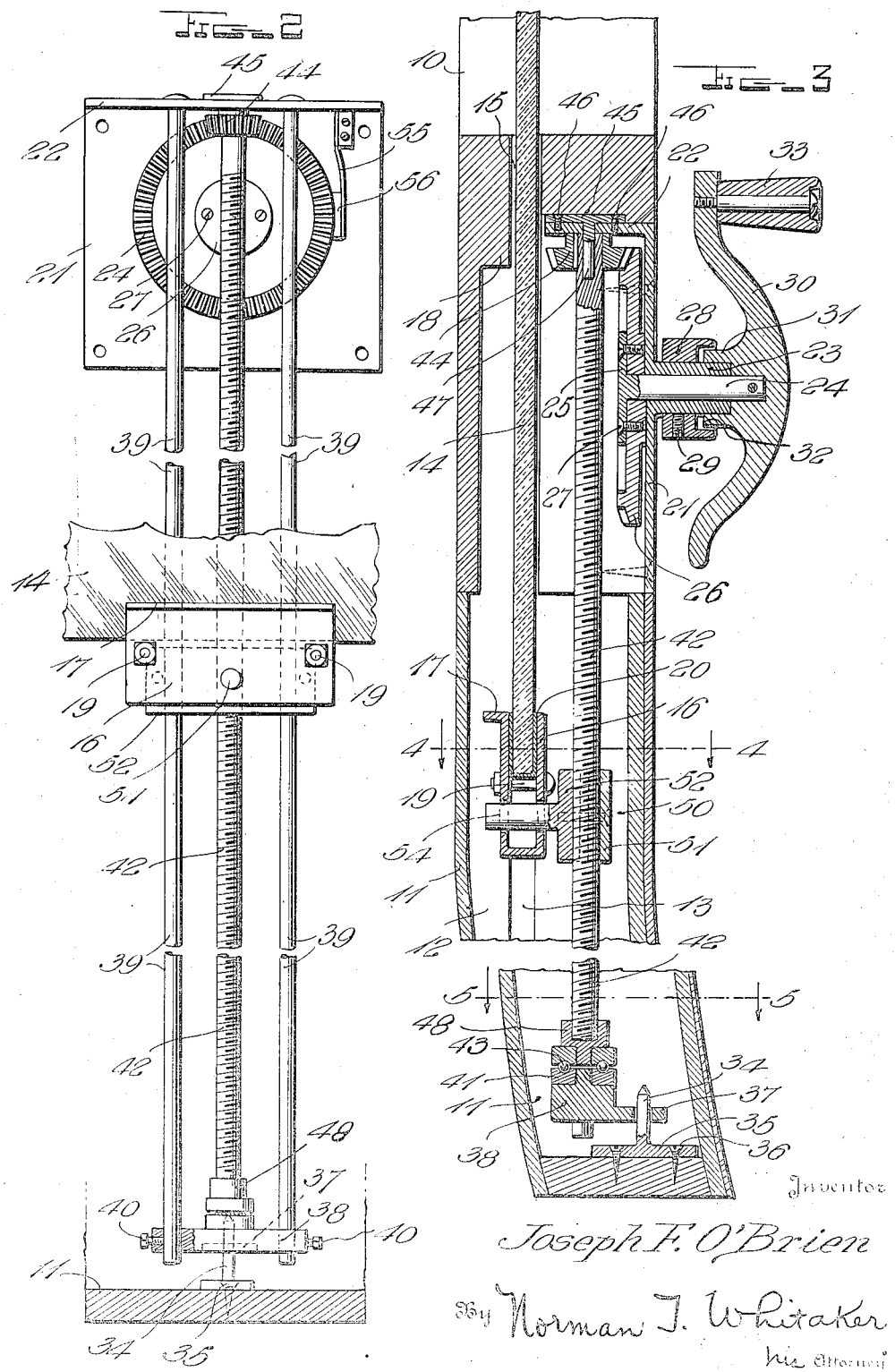

JOSEPH F. O'BRIEN, OF NEW YORK, N. Y.

WINDOW-CLOSURE.

1,281,197.

Specification of Letters Patent.

Patented Oct. 8, 1918.

Application filed April 17, 1918. Serial No. 229,151.

*To all whom it may concern:*

Be it known that I, JOSEPH F. O'BRIEN, a citizen of the United States, and a resident of New York, in the county of New York and State of New York, have invented new and useful Improvements in Window-Closures, of which the following is a specification.

This invention relates to window closures and has particular reference to that class of windows forming a part of an automobile body construction.

An important object of the invention is to provide in a device of the above mentioned character a means whereby the window forming a part of an automobile construction may be easily and quickly elevated to a closed position.

A further object of the invention is to provide in a device of the above mentioned character a means whereby the window with which my device is used may be securely retained at any desired elevation.

A further object of the invention is to provide in a device of the above mentioned character a means whereby the several elements employed in the device may be readily assembled.

A further object of the invention is to provide a device of the above mentioned character which may be easily installed upon an automobile door of the conventional type without altering or changing the structure to which the device is adapted to be applied.

A further object of the invention is to provide a device which is simple in construction, cheap to manufacture, and reliable in operation.

Other objects and advantages of the invention will be apparent during the course of the following description taken in connection with the accompanying drawings.

In the accompanying drawings, forming a part of this specification and in which like numerals are employed to designate like parts throughout the same, Figure 1 is a vertical transverse sectional view through an automobile door showing the device embodying my invention installed thereupon, Fig. 2 is a rear elevation of the device embodying my invention, the same being shown as removed from within a door with which it is adapted to be used, Fig. 3 is an enlarged detail vertical transverse sectional view through an automobile door having the device embodying my invention installed thereupon, Fig. 4 is a horizontal sectional view taken on line 4—4 of Fig. 3, and, Fig. 5 is a horizontal sectional view taken on line 5—5 of Fig. 3.

In the drawings, wherein for the purpose of illustration is shown the preferred form of my invention, the numeral 10 indicates as a whole an automobile door such as is commonly employed in connection with automobile bodies of the limousine type. This door comprises a lower section 11 carrying a frame 12 which is provided with a slot 13 extending throughout the length of the same and into the lower section 11 as clearly shown in Fig. 1. The slot is adapted to receive therein a glass panel 14 extending through a slot 15, into the interior of the section 11. The lower portion of the glass panel 14 is arranged within a receiver 16 carrying a flange 17 which is adapted to engage an offset 18 when the glass panel 14 has been moved to a maximum elevation as will be readily understood when considering the hereinafter described operation of the device. A bolt 19 is passed through the receiver 16 as clearly shown in Fig. 2 and serves as a means for clamping the lower edge of the glass panel 14 within the receiver. In order to protect that portion of the glass panel which is clamped within the receiver 16 there is provided a packing 20 which is arranged between the surface of the glass panel and the sides of the receiver 16 as clearly shown in Fig. 2. Within the lower section 11 there is arranged a rectangular plate 21 carrying a flange 22. The plate 21 is provided with a boss or hub 23 within which is journaled a shaft 24 carrying a plate 25 to which is secured a gear 26 by means of screws 27 or the like. Upon the hub or boss 23 there is arranged a collar 28 which is secured to the boss or hub 23 by means of a set-screw 29. To the shaft 25 there is secured a crank 30 provided with a hub 31 a portion of which encircles the hub or boss 23 as shown at 32. To the crank 30 there is secured the conventional form of hand-grip 33. Within the section 11 there is arranged a pointed stud 34 carried by a base 35 which is secured in position within the section 11 by means of screws 36 or the like. The stud 34 extends upwardly through a lip 37 carried by an elongated bar 38. To the flange 22 and the ends of the bar 38 there is connected a pair of elongated rods 39, the lower ends of which are retained within the bar 38 by means of set-screws 40. Upon the bar 38 there is arranged an annular boss 41 supporting a rotatable screw spindle 42 mounted upon a ball bearing 43 as clearly shown in Fig. 2. To the upper end of the screw spindle 42 there is keyed a pinion 44 having engagement with the bevel gear 24. In order to retain the pinion 44 in engagement with the bevel gear 24 there is provided a plate 45 which is secured to the flange 22 by means of screws 46 as shown in Fig. 2. To the plate 45 there is secured a bearing pin 47 which extends downwardly through the flange 22 and into the end of the screw spindle 42, the screw spindle being free to rotate with respect to the spindle 47. In order to retain the lower end of the screw spindle 42 in position with respect to the boss 41 there is provided a socket 48 which is secured to the spindle 42 and arranged to extend downwardly therefrom as clearly shown in Fig. 2. Upon the rods 39 and the worm 42 there is mounted a reciprocatory lift indicated as a whole by the numeral 50. This lift comprises a pair of plates 51 and 52 which are secured together by means of screws 53 or the like. In this connection I wish it understood that the plates 51 and 52 are retained in screw-thread engagement with the screw spindle 42 in order that the lift 50 as a whole may be raised or lowered upon the actuation of the screw spindle 42 as will hereinafter be described while the plates 51 and 52 are free to slide upon the rods 39. To the plate 52 there is secured a supporting pin 54 which protrudes through the receiver 16 as clearly shown in Figs. 1 and 2. To the plate 21 there is secured a spring member 55 having a shoe 56 which is adapted to engage the periphery of the bevel gear 24 in order that the crank 30 may be retained in a given position, thereby preventing accidental or undesirable rotation of the same, which accidental or undesirable rotation would likely occur in the traveling over a rough road of a vehicle having the device embodying my invention used in connection therewith In use, the operation of the device is as follows: Should it be desired to elevate the glass panel 14 from the position shown in Fig. 1 the crank 30 is rotated thereby imparting rotary motion to the screw spindle 42 whereupon the receiver 16 as a whole carrying the panel 14 may be elevated thereby partially or totally closing the opening within the frame 12. Should it be desired to lower the panel 14 the crank 30 may be rotated in an opposite direction whereupon the receiver 16 as a whole together with the panel 14 is allowed to descend to a desired point. Thus it is obvious that by employing the device embodying my invention little difficulty will be found in either raising or lowering the panel 14 to close or open the opening provided within the frame 12 of the automobile door indicated as a whole by the numeral 10.

From the foregoing description, taken in connection with the accompanying drawing, the advantages of the construction and method of operation will be readily understood by those skilled in art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention what I claim as new and desire to secure and protect by United States Letters Patent, is:

1. In a window closure, the combination with an automobile door of a vertically movable panel, a rotatable element, a gear carried by the rotatable element, a plate adapted to be secured to said door, a spindle projected through said plate and having pivotal engagement with said rotatable element, a shaft journaled within said plate, said shaft having a plate formed integral therewith, a second gear carried by the shaft and having engagement with the first named gear, the second named gear being secured to the second named plate, a receiver carried by said panel, a lift having screw thread engagement with said rotatable element, means for connecting said receiver with said lift, and means for imparting rotation to the latter named gear whereby said panel may be moved vertically with respect to said rotatable element.

2. In a window closure, the combination with an automobile door of a vertically movable panel, a rotatable element, a gear carried by the rotatable element, a plate adapted to be secured to said door, a spindle projected through said plate and having pivotal engagement with said rotatable element, a shaft journaled within said plate, said shaft having a plate formed integral therewith, a second gear carried by the shaft and having engagement with the first named gear, the second named gear being secured to the second named plate, a receiver carried by said panel, a pair of guide rods arranged parallel to said rotatable element, a pair of plates having screw-thread engagement with said rotatable element and slidably engaging said guides, said plates being spaced from each other, adjusting means associated with said plates for increasing the friction between said plates and said guide rods, means for connecting said receiver with said plates, and means for imparting rotation to the latter named gear whereby said panel may be moved vertically with respect to said rotatable element.

JOSEPH F. O'BRIEN.